United States Patent
Don et al.

(10) Patent No.: US 12,411,811 B2
(45) Date of Patent: Sep. 9, 2025

(54) EFFICIENT STORAGE DEVICE HANDLING IN REMOTE REPLICATION

(71) Applicant: DELL PRODUCTS L.P., Hopkinton, MA (US)

(72) Inventors: Arieh Don, Newton, MA (US); Lev Knopov, Brookline, MA (US); Igor Achkinazi, Northboro, MA (US)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 18/411,103

(22) Filed: Jan. 12, 2024

(65) Prior Publication Data

US 2025/0231918 A1    Jul. 17, 2025

(51) Int. Cl.
*G06F 16/178* (2019.01)

(52) U.S. Cl.
CPC .................. *G06F 16/178* (2019.01)

(58) Field of Classification Search
CPC .. G06F 16/178; G06F 16/184; G06F 16/1844; G06F 16/27; G06F 3/065
USPC ....... 707/610, 611, 612, 613, 614, 615, 616, 707/617, 618, 619, 620, 637, 809, 756
See application file for complete search history.

(56) References Cited

U.S. PATENT DOCUMENTS

| | | | | |
|---|---|---|---|---|
| 6,163,856 A | * | 12/2000 | Dion ................... | G06F 11/2071 |
| | | | | 714/4.11 |
| 2005/0177603 A1 | * | 8/2005 | Shavit ................. | G06F 11/2074 |
| | | | | 714/E11.107 |
| 2006/0179082 A1 | * | 8/2006 | Boyd .................. | G06F 11/1662 |
| | | | | 707/999.203 |
| 2014/0129765 A1 | * | 5/2014 | Cho .................... | G06F 11/1666 |
| | | | | 711/105 |
| 2014/0173230 A1 | * | 6/2014 | Smith .................. | G06F 3/0655 |
| | | | | 711/162 |
| 2016/0063083 A1 | * | 3/2016 | Mu ....................... | H04L 47/828 |
| | | | | 709/227 |
| 2016/0321338 A1 | * | 11/2016 | Isherwood .......... | H04L 67/1097 |
| 2017/0046083 A1 | * | 2/2017 | Park ...................... | G06F 3/0656 |
| 2020/0012578 A1 | * | 1/2020 | Hayes ................. | G06F 11/1092 |
| 2021/0081432 A1 | * | 3/2021 | Grunwald ............ | G06F 11/1471 |
| 2022/0004459 A1 | * | 1/2022 | Pandey ................ | G06F 11/2094 |
| 2022/0229734 A1 | * | 7/2022 | Seela .................. | G06F 11/1451 |
| 2023/0333777 A1 | * | 10/2023 | Shveidel ............... | G06F 3/0619 |

* cited by examiner

*Primary Examiner* — William P Bartlett
(74) *Attorney, Agent, or Firm* — Anderson Gorecki LLP

(57) ABSTRACT

In a software-defined data storage system with a production node and local and remote storage nodes that replicate data generated by an application running on the production node, all filesystem metadata associated with remotely replicated devices is copied from the remote storage node to memory of the production node in response to establishment of a communication link between the production node and remote storage node. That metadata is maintained in the memory for as long as the link is active and used to generate multiple remote replication IOs. Local replication is implemented by reading only necessary metadata from the local storage node on a per-IO basis. The cached metadata is flushed from memory in response to loss of the communication link.

20 Claims, 3 Drawing Sheets and # EFFICIENT STORAGE DEVICE HANDLING IN REMOTE REPLICATION

TECHNICAL FIELD

The subject matter of this disclosure is generally related to electronic data storage.

BACKGROUND

Some software-defined data storage systems have separate production nodes and storage nodes. Each production node can be a server that is configured to run instances of productivity applications that are used to perform organizational processes. Each storage node can be a server with direct-attached storage (DAS) and software configured to manage access to the data that is generated and used by the productivity applications. Each application instance on a production node runs under an operating system (OS) that supports input-output (IO) operations between the application instance and the logical storage objects on which the application data is stored by the storage nodes. For each write IO by an application to a storage object, the operating system of the production node first reads associated metadata from remote disk storage on the production node to enable generation of a write command that identifies the storage object by name/ID and specifies the range of logical block addresses (LBAs) to be updated by the write IO. The metadata, which is stored in a filesystem (FS) directory allocated to the storage object, includes a file with data that represents the storage object and other files that define various parameters of the storage object. When an application such as Oracle, for example, uses a Linux OS call to read or write data, the application sends device/cmd/LBA to the operating system and, in response, the operating system finds the directory for the device, opens and reads any needed metadata files into memory, opens the file holding that LBA range data, writes the new data to that file, and then close all the files. Similarly, a read command causes the operating system to read the appropriate file for the LBA and send the requested data to the application.

SUMMARY

In some implementations, an apparatus comprises: a production node that hosts an application; a remote storage node that maintains a storage object on which application data is stored, the storage object being represented by filesystem metadata; and an application programming interface (API) on the production node configured to: copy all the filesystem metadata associated with the storage object from the remote storage node to memory of the production node responsive to establishment of communication between the production node and the remote storage node; and use the filesystem metadata in the memory of the production node to generate remote replication input-output (IO) commands to replicate each of a plurality of writes by the application to the storage object.

In some implementations, a method comprises: in a software-defined storage system in which data generated by an application running on a production node is remotely replicated on a storage object maintained by a remote storage node: copying all filesystem metadata associated with the storage object from the remote storage node to memory of the production node responsive to establishment of communication between the production node and the remote storage node; and using the filesystem metadata in the memory of the production node to generate remote replication input-output (IO) commands to replicate each of a plurality of writes by the application to the storage object.

In some implementations, a non-transitory computer-readable storage medium stores instructions that when executed by a computer in a software-defined storage system in which data generated by an application running on a production node is remotely replicated on a storage object maintained by a remote storage node cause the computer to perform a method comprising: copying all filesystem metadata associated with the storage object from the remote storage node to memory of the production node responsive to establishment of communication between the production node and the remote storage node; and using the filesystem metadata in the memory of the production node to generate remote replication input-output (IO) commands to replicate each of a plurality of writes by the application to the storage object.

Other aspects, features, and implementations may become apparent in view of the detailed description and figures. All examples, aspects, implementations, and features mentioned in this disclosure can be combined in any technically possible way.

DETAILED DESCRIPTION

The terminology used in this disclosure is intended to be interpreted broadly within the limits of subject matter eligibility. The terms "disk" and "drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

A drawback of per-write accesses to metadata is that remote replication incurs both network latency and disk access latency on a per-write basis. For device replication, the production node functions as an initiator for separate writes to both a local storage node and a remote storage node as targets. Reading the metadata associated with the local replica prior to writing to the local replica is typically a low latency procedure due to the physical proximity of the production node relative to the local storage node. However, reading the metadata associated with the remote replica before writing the data for remote replication involves greater latency due to the lack of physical proximity between the production node and the local storage node. Moreover, the network latency and disk access latency are additive.

Figure 1:
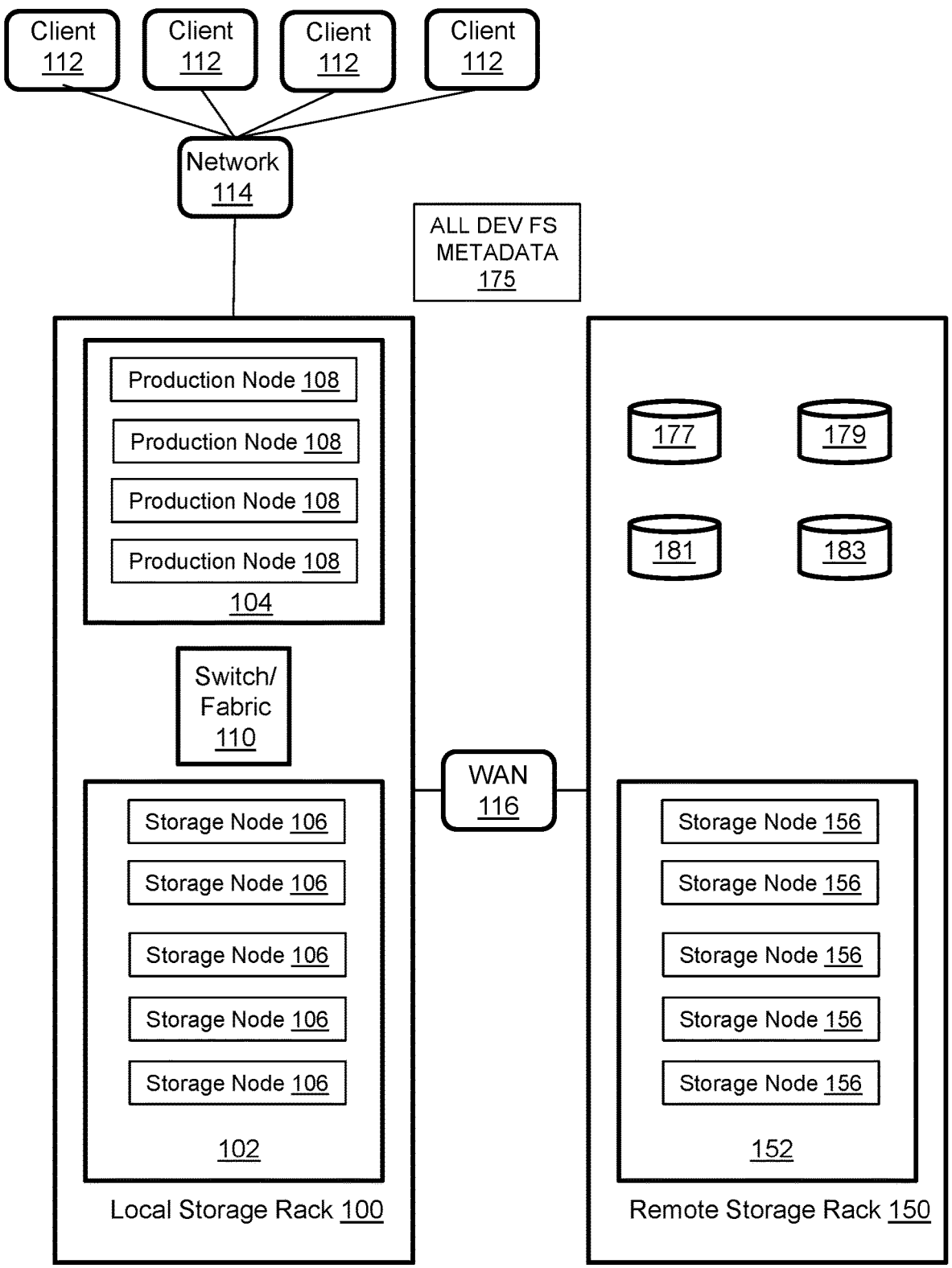
FIG. 1 illustrates a software-defined storage system with efficient device handling for remote replication.

FIG. 1 illustrates a software-defined storage system with efficient device handling for remote replication. A local storage rack 100 includes a cluster 102 of storage nodes 106 and a cluster 104 of production nodes 108. The storage nodes 106 are interconnected with the production nodes by a switch/fabric 110. Remote storage rack 150 includes a cluster 152 of storage nodes. The local storage rack and the remote storage rack are interconnected via a wide area network (WAN) 116 and separated by a physical distance normally associated with the requirement of a WAN, e.g., without limitation, over 100 km. The physical distance results in greater network communication latency between the production nodes 108 and remote storage nodes 156 than between the production nodes and local storage nodes 106.

The production nodes 108 provide computational capacity. The storage nodes 106, 156 provide storage capacity. Host applications that support organizational processes run on the production nodes 108 and use data stored by the storage nodes 106, 156. The host applications provide services to client computers 112 that are in communication with the local storage rack 100 via a network 114. Examples of host applications may include, but are not limited to, software for email, accounting, sales, manufacturing, and inventory control. As will be explained in greater detail below, for as long as the connection between the local storage rack and remote storage rack remains active, the production nodes 108 maintain cached copies of all device filesystem metadata 175 associated with remotely-maintained storage objects 177, 179, 181, 183 that are used by applications running on the production nodes, e.g., replicated devices on storage nodes 156. Consequently, the production nodes 108 are not required to read metadata from the storage nodes 156 of the remote storage rack 150 on a per-IO basis.

Figure 2:
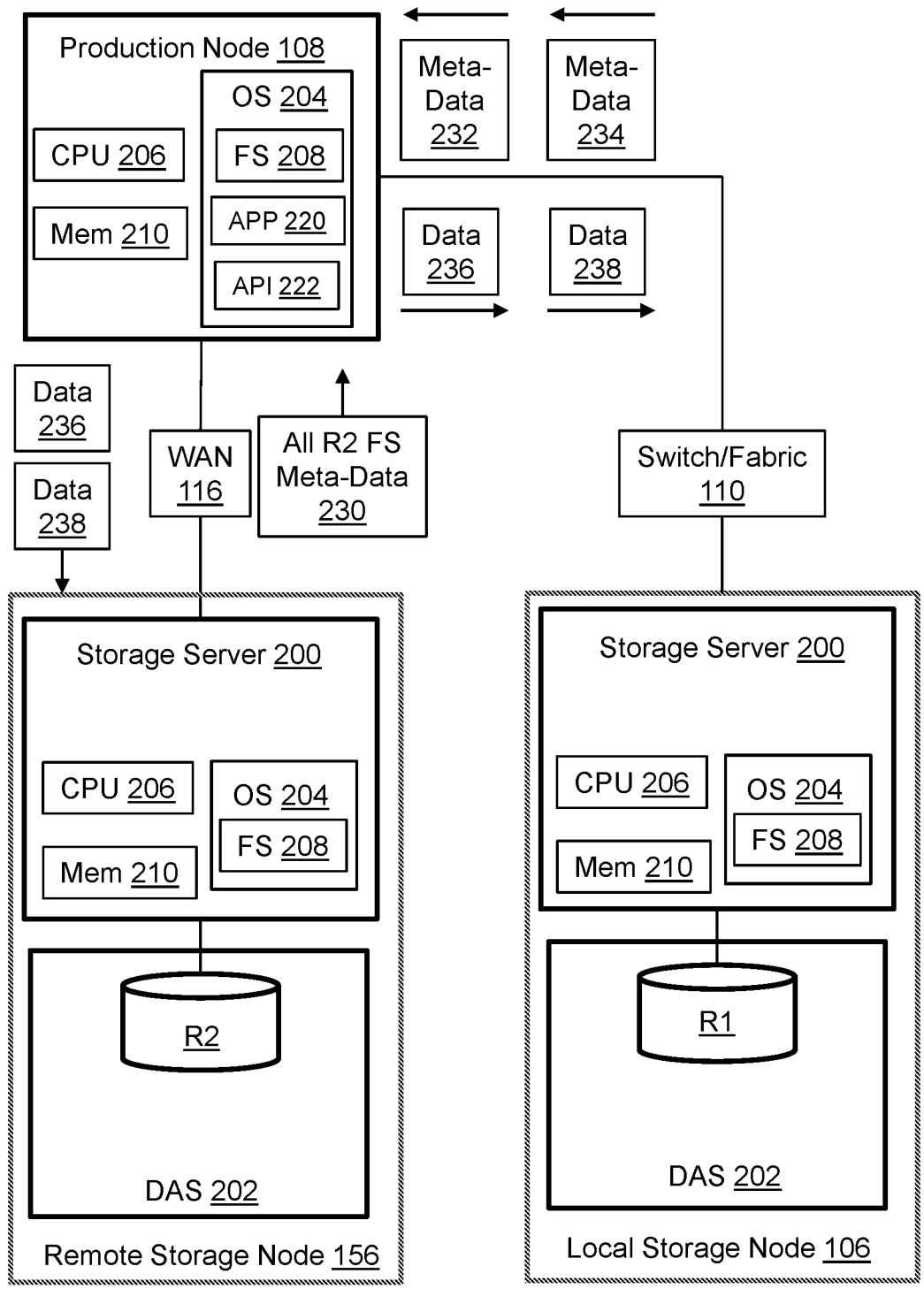
FIG. 2 illustrates local and remote replication in greater detail.

FIG. 2 illustrates local and remote replication in greater detail. The local storage node 106 and remote storage node 156 each include a storage server 200 and direct-attached storage (DAS) 202. The storage servers include processors/central processing units (CPUs) 206 and volatile memory 210. The volatile memory may include dynamic random-access memory (DRAM) of any kind. The DAS 202 is non-volatile disk drive storage that may include one or more solid-state drives (SSDs), hard disk drives (HDDs), or both. An operating system (OS) 204 such as Linux is loaded on to each storage server and a filesystem (FS) 208 is maintained and used by that OS. The FS 208 includes metadata that describes each storage object that is used by an application 220 and replicated as devices R1, R2 on the disk drives. The production node 108 also includes CPUs 206, volatile memory 210, OS 204, and FS 208. Additionally, the production node 108 runs the productivity application 220 and includes an application programming interface (API) 222 for facilitating device handling for remote replication.

Replication to R1 on the local storage node 106 is performed in a standard manner. For each write IO generated by application 220, the application calls the OS 204, which reads only the metadata that is necessary for that write from disk storage on the local storage node 106. For example, metadata 232 is read from the local storage node 106 to the memory of the production node to generate a command to write data 236 and, at a different time, metadata 234 is read from the local storage node 106 to the memory of the production node to generate a command to write data 238. In contrast, API 222 reads the FS 208 metadata for all storage devices involved in remote replication relationships and keeps that metadata resident in the memory of the production node for as long as the communication link is active. API 222 reads all FS metadata 230 associated with device R2 into the memory of the production node 108 when the connection between the production node and remote storage node is established. Consequently, that metadata 230 can be accessed from the memory of the production node 108 to generate commands to write data 236 and data 238, thereby avoiding per-IO retrieval of metadata from remote storage node 156.

The complete set of metadata 230 associated with R2 may be read by API 222 when the connection between the production node 108 and remote storage node 156 is established and used thereafter for as long as the connection remains operational. If the connection fails, the metadata 230 is flushed from the memory of the production node. Because metadata is valid only when the connection is available, and retrieved by the production node initiator each time the connection with the remote storage node target is established, there is no risk of loss of metadata associated with flushing the metadata from memory and no need for saving to the metadata to files on disk when the connection fails.

The replicated data 236, 238 is cached in the memory of the production node 108 in addition to being written to disk. Caching the replicated data, which is the payload to be sent to both the local storage node and the remote storage node, can eliminate the need to read the data from disk for replication, which requires the OS 204 to locate the appropriate directory, open the metadata files, find the file with the data, and retrieve the data. The remote storage node saves the written data to disk as if received from a host.

Figure 3:
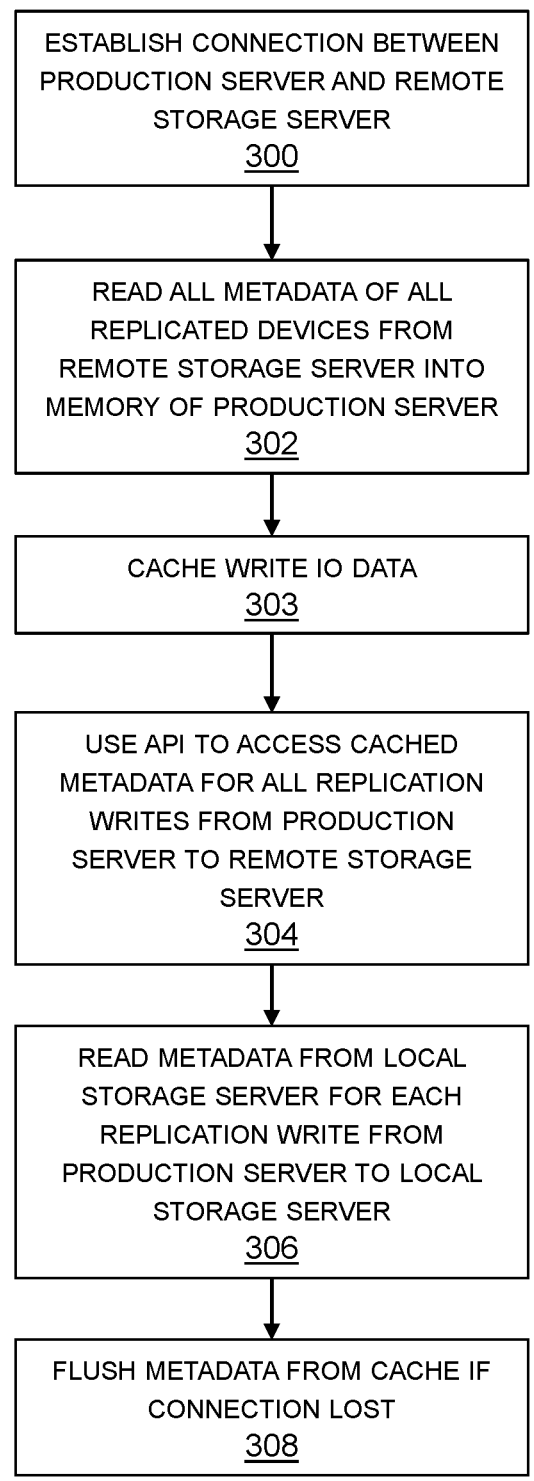
FIG. 3 illustrates a method for efficient device handling for remote replication.

FIG. 3 illustrates a method for efficient device handling for remote replication. Step 300 is establishing a connection between a production server and a remote storage server involved in a remote replication relationship. Step 302 is reading all FS metadata of all replicated devices from the remote storage server into the memory of the production server. That metadata is cached by the production server for as long as the communication link with the remote storage server is active. The production server will process various FS calls from the application to read and write data to the replicated storage object. Step 303 is caching write IO data in the memory of the production server. This may happen in response to each write by an application running on the production server. In step 304 the production server accesses the cached metadata to generate a write command to remotely replicate the write IO data. That write command and the data are sent from the production server to the remote storage server. In step 306 the production server reads (from the local storage server) only the metadata needed to generate a write IO to locally replicate the write IO data. That metadata is used to generate a write command that is sent to the local storage server with the write IO data that was cached. In step 308 the cached metadata is flushed from memory in response to loss of the connection between the production server and the remote storage server.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
in a software-defined storage system in which input-output (IO) commands generated by an application running on a production node are remotely replicated on a storage object known by the production node to be maintained by a remote storage node:
while the application is running on the production node, copying all filesystem metadata associated with the storage object, including metadata that identifies data structures stored on the storage object and logical block addresses of the storage object at which of each of the data structures is stored, from the remote storage node to memory of the production node responsive to establishment of communication between the production node and the remote storage node; and
using the metadata that identifies the data structures stored on the storage object and logical block addresses of the storage object at which each of the data structures is stored in the memory of the production node to generate remote replication IO commands to replicate each of a plurality of writes by the application to the data structures stored on the storage object subsequent to copying all filesystem metadata associated with the storage object, thereby avoiding per-write copying of metadata from the remote storage node to the production node.

2. The method of claim 1 further comprising locally replicating the storage object on a local storage node and the production node reading filesystem metadata from the local storage node into the memory of the production node for each of the writes by the application to the storage object to generate local replication IO commands.

3. The method of claim 1 further comprising copying all filesystem metadata associated with all replicated storage objects from the remote storage node to memory of the production node responsive to establishment of communication between the production node and the remote storage node.

4. The method of claim 3 further comprising flushing the filesystem metadata associated with all replicated storage objects from the memory of the production node in response to loss of communication between the production node and the remote storage node.

5. The method of claim 1 further comprising caching write IO data in the memory of the production node responsive to a call from the application.

6. The method of claim 5 further comprising using the cached write IO data for remote replication.

7. The method of claim 1 further comprising flushing the filesystem metadata associated with the storage object from the memory of the production node in response to loss of communication between the production node and the remote storage node.

8. An apparatus, comprising:
a first physical computer configured as a production node that hosts an application;
a second physical computer configured as a remote storage node that maintains a storage object on which application data is stored by replicating input-output (IO) commands generated on the first physical computer by the application, the storage object being represented by filesystem metadata and known to the first physical computer; and
an application programming interface (API) on the production node configured to:
while the application is running on the production node, copy all the filesystem metadata associated with the storage object, including metadata that identifies each of a plurality of data structures stored on the storage object and logical block addresses of the storage object at which each of the data structures is stored, from the remote storage node to memory of the production node responsive to establishment of communication between the production node and the remote storage node; and
use the metadata that identifies the data structures stored on the storage object and logical block addresses of the storage object at which each of the data structures is stored in the memory of the production node to generate remote replication IO commands to replicate each of a plurality of writes by the application to the data structures stored on the storage object subsequent to copying all filesystem metadata associated with the storage object, thereby avoiding per-write copying of metadata from the remote storage node to the production node.

9. The apparatus of claim 8 further comprising the storage object being locally replicated on a local storage node and the production node being configured to read filesystem metadata from the local storage node into the memory of the production node for each of the writes by the application to the storage object to generate local replication IO commands.

10. The apparatus of claim 8 further comprising the API being configured to copy all filesystem metadata associated with all replicated storage objects from the remote storage node to memory of the production node responsive to establishment of communication between the production node and the remote storage node.

11. The method of claim 10 further comprising the API being configured to flush the filesystem metadata associated with all replicated storage objects from the memory of the production node in response to loss of communication between the production node and the remote storage node.

12. The apparatus of claim 8 further comprising the API being configured to cache write IO data in the memory of the production node responsive to a call from the application.

13. The apparatus of claim 12 further comprising the API being configured to use the cached write IO data for remote replication.

14. The apparatus of claim 8 further comprising the API being configured to flush the filesystem metadata associated with the storage object from the memory of the production node in response to loss of communication between the production node and the remote storage node.

15. A non-transitory computer-readable storage medium storing instructions that when executed by a computer in a software-defined storage system in which input-output (IO) commands generated by an application running on a production node are remotely replicated on a storage object known by the production node to be maintained by a remote storage node cause the computer to perform a method comprising:

while the application is running on the production node, copying all filesystem metadata associated with the storage object, including metadata that identifies each of a plurality of data structures stored on the storage object and logical block addresses of the storage object at which each of the data structures is stored, from the remote storage node to memory of the production node responsive to establishment of communication between the production node and the remote storage node; and using the metadata that identifies the data structures stored on the storage object and logical block addresses of the storage object at which each of the data structures is stored in the memory of the production node to generate remote replication IO commands to replicate each of a plurality of writes by the application to the data structures stored on the storage object subsequent to copying all filesystem metadata associated with the storage object, thereby avoiding per-write copying of metadata from the remote storage node to the production node.

16. The non-transitory computer-readable storage medium of claim 15 in which the method further comprises locally replicating the storage object on a local storage node and the production node reading filesystem metadata from the local storage node into the memory of the production node for each of the writes by the application to the storage object to generate local replication IO commands.

17. The non-transitory computer-readable storage medium of claim 15 in which the method further comprises copying all filesystem metadata associated with all replicated storage objects from the remote storage node to memory of the production node responsive to establishment of communication between the production node and the remote storage node.

18. The non-transitory computer-readable storage medium of claim 17 in which the method further comprises flushing the filesystem metadata associated with all replicated storage objects from the memory of the production node in response to loss of communication between the production node and the remote storage node.

19. The non-transitory computer-readable storage medium of claim 15 in which the method further comprises caching write IO data in the memory of the production node responsive to a call from the application.

20. The non-transitory computer-readable storage medium of claim 19 in which the method further comprises using the cached write IO data for remote replication.

* * * * *